(12) United States Patent
Wagner et al.

(10) Patent No.: US 8,631,407 B2
(45) Date of Patent: Jan. 14, 2014

(54) REAL TIME FLASH BASED USER INTERFACE FOR MEDIA PLAYBACK DEVICE

(75) Inventors: Bill Wagner, San Diego, CA (US); Brian Oberholtzer, San Diego, CA (US); Ramon Davila, Coatesville, PA (US); Frederick F. Hermanson, Annville, PA (US)

(73) Assignee: Sonic IP, Inc., Santa Clara, CA (US)

( * ) Notice: Subject to any disclaimer, the term of this patent is extended or adjusted under 35 U.S.C. 154(b) by 86 days.

(21) Appl. No.: 12/986,957

(22) Filed: Jan. 7, 2011

(65) Prior Publication Data

US 2011/0258623 A1     Oct. 20, 2011

Related U.S. Application Data

(60) Provisional application No. 61/335,592, filed on Jan. 7, 2010, provisional application No. 61/293,180, filed on Jan. 7, 2010, provisional application No. 61/430,135, filed on Jan. 5, 2011.

(51) Int. Cl.
*G06F 9/455*     (2006.01)

(52) U.S. Cl.
USPC .............................................. 718/1; 719/328

(58) Field of Classification Search
USPC .............................................. 718/1; 719/328
See application file for complete search history.

(56) References Cited

U.S. PATENT DOCUMENTS

| | | | |
|---|---|---|---|
| 7,546,576 B2 * | 6/2009 | Egli | 717/106 |
| 2002/0156909 A1 * | 10/2002 | Harrington | 709/231 |
| 2002/0164973 A1 | 11/2002 | Janik | |
| 2003/0084120 A1 | 5/2003 | Egli | |
| 2007/0074258 A1 | 3/2007 | Wood et al. | |
| 2007/0192818 A1 | 8/2007 | Bourges et al. | |

FOREIGN PATENT DOCUMENTS

WO     2011085249 A1     7/2011

OTHER PUBLICATIONS

International Search report for application PCT/US2011/020580, Mailed Mar. 11, 3011, Report completed Feb. 19, 2011, 2 pgs.
Written Opinion for application PCT/US2011/020580, Mailed Mar. 11, 3011, Report completed Feb. 12, 2011, 5 pgs.
"Creating an XML Slideshow in Flash", Retrieved from: Retrieved on Apr. 12, 2013, Apr. 22, 2009, pp. 1-5.
"The HAVi Specification: Specification of the Home Audio/Video Interoperabilty (HAVi) Architecture", Havi Specification, Nov. 19, 1998, pp. 1-384.
"Creating an XML Slideshow in Flash", Retrieved from: Retrieved on Sep. 2, 2013, 17 pgs.
"The HAVi Specification: Specification of the Home Audio/Video Interoperability (HAVi) Architecture", Havi Specification, Nov. 19, 1998, 409 pgs.

* cited by examiner

*Primary Examiner* — Andy Ho
(74) *Attorney, Agent, or Firm* — KPPB LLP

(57) ABSTRACT

Common clients for consumer electronics devices that include natively implemented virtual machines are described. One embodiment of the invention includes audio and video decoders, a natively implemented host process, a natively implemented virtual machine, a common client including natively implemented processes configured to coordinate playback of audio and video using the playback device's audio and video decoders, a VM framework configured to execute within the virtual machine and to enable scripts executing within the virtual machine to initiate playback of audio and video using the natively implemented processes, and a user interface implemented as a script configured to be executed within the virtual machine.

21 Claims, 11 Drawing Sheets

REAL TIME FLASH BASED USER INTERFACE FOR MEDIA PLAYBACK DEVICE

CROSS-REFERENCES TO RELATED APPLICATIONS

The present application claims priority to U.S. Provisional Application No. 61/335,592 entitled "Real Time Flash Based User Interface for Media Playback Device", filed Jan. 7, 2010, U.S. Provisional Application No. 61/293,180 entitled "Systems and Methods for Accessing Content Using an Internet Content Guide", filed Jan. 7, 2010, and U.S. Provisional Application No. 61/430,135 entitled "Systems and Methods for Dynamically Loading Software Platforms onto Consumer Electronics Devices", filed Jan. 5, 2011. The disclosure of U.S. Provisional Applications Nos. 61/335,592, 61/293,180, and 61/430,135 is hereby incorporated by reference in its entirety.

BACKGROUND

The present invention generally relates to consumer electronics devices and more specifically to consumer electronics devices configured to playback content accessed via the Internet.

An increasing variety of consumer electronics devices, including but not limited to televisions, DVD/Blu-ray players, set-top boxes, mobile phones and game consoles, possess the capability of connecting to the Internet. An enormous variety of content exists on the Internet, which is accessible from numerous sources. Each source typically publishes content in its own unique way. Personal computers can access content via the Internet using a web browser application and a variety of plug-ins that enable viewing of the content, which can include but is not limited to audio, video, text, and/or still images. Discovery of content is often facilitated by the recommendations of a specific site, recommendations of other users, and/or a search engine. Navigation using a web browser and search engines is reliant upon use of a keyboard and a pointing device such as a mouse or touchpad. Consumer electronics devices typically provide a remote control or game controller as a user input device. Such input devices are unsuited to navigation using a web browser and/or searching via a search engine. Therefore, manufacturers of consumer electronics devices typically develop user interfaces specific to a particular device that enable the devices to access content via the Internet from a limited number of sources. Considerable effort is required to integrate each site from which content is accessible via the user interface and that effort is replicated by each manufacturer and for each class of device.

SUMMARY OF THE INVENTION

Systems and methods for providing user interfaces using a natively implemented Virtual Machine (VM) and playing back Internet content in real time on a playback device in accordance with embodiments of the invention are described. One embodiment of the invention includes audio and video decoders, a natively implemented host process, a natively implemented virtual machine, a common client including natively implemented processes configured to coordinate playback of audio and video using the playback device's audio and video decoders, a VM framework configured to execute within the virtual machine and to enable scripts executing within the virtual machine to initiate playback of audio and video using the natively implemented processes, and a user interface implemented as a script configured to be executed within the virtual machine.

In another embodiment, the natively implemented processes are also configured to locally cache URI objects, the VM framework is configured to intercept URI requests made by scripts executing within the virtual machine and to provide the URI requests to the natively implemented processes, and the natively implemented processes are configured to verify that a requested URI object is not located within the local cache before requesting a URI object from a remote server.

In a further embodiment, the common client provides a runtime environment for applications deployed as a combination of a script configured to execute within the virtual machine and natively compiled code, and the VM framework is configured to enable the application script to utilize the common client's natively implemented processes and the application's natively compiled code during execution of the application script within the virtual machine.

In a still further embodiment, the user interface includes an Internet Content Guide identifying content on remote servers that can be played back by the playback device.

In still another embodiment, the Internet Content Guide also includes information concerning video player applications associated with content identified within the Internet Content Guide, the VM framework is configured to request at least one video player application in response to a user selecting a piece of content within the Internet Content Guide user interface for playback, where the Internet Content Guide indicates that the at least one video player application is utilized during the playback of the selected content, the natively implemented processes are configured to provide requested video player applications to the VM framework, the VM framework is configured to instantiate video player applications provided by the natively implemented processes and provide the Internet Content Guide with interface information, and the Internet Content Guide user interface is configured to utilize video player interface information to coordinate content playback in conjunction with the video player application.

In a yet further embodiment, a content player application is requested.

In yet another embodiment, an ad player application is requested.

In a further embodiment again, a metric player application is requested.

In another embodiment again, the VM framework also instantiates a proxy player application.

In a further additional embodiment, the natively implemented processes include a Device Application process configured to retrieve information from remote servers and a Platform Services process configured to handle playback of audio and video using the playback device's audio and video decoders, the virtual machine is a Flash virtual machine implemented within a natively implemented Flash player, the VM framework is an ActionScript framework comprising a set of ActionScript classes, and the Device Application process is configured to communicate with the ActionScript framework via the Flash player's XMLSocket capability.

In another additional embodiment, applications are deployed on the common client as a SWF and a natively compiled plug-in to the Device Application process.

In a still yet further embodiment, the Device Application process and application natively compiled plug-ins to the Device Application process are implemented as shared libraries.

In still yet another embodiment, the common client further includes an installer, and the common client is configured to provide a software platform and components of the common client can be dynamically loaded using the installer.

In a still further embodiment again, the virtual machine is a Flash virtual machine implemented within a natively compiled Flash player, the natively implemented processes includes a device application container configured to provide a set of services and APIs, and a platform runtime process configured to provide an abstraction layer between the playback device and the device application container, the VM framework includes a UI application container configured to expose a set of APIs enabling a Flash application executing within the Flash virtual machine to communicate with an associated natively implemented module, the user interface is implemented as an application bundle including a SWF, and a natively compiled code module. In addition, the user interface SWF is configured to communicate with the natively compiled code module via the UI application container APIs, and the natively compiled code module is configured to implement the functionality of the user interface that is not provided by the Flash virtual machine using services and APIs provided by the device application container.

In still another embodiment again, the application bundle further includes a manifest.

In a still further additional embodiment, the installer is configured to dynamically load applications from a remote server, where the applications include a SWF, a natively compiled code module, and a manifest.

In still another additional embodiment, the installer is implemented in playback device ROM and the installer is configured to dynamically load the software platform into device memory.

In a yet further embodiment again, the user interface includes an Internet Content Guide generated using a navigation hierarchy obtained by the user interface from a remote server.

In yet another embodiment again, the user interface is configured to enable navigation within the hierarchical ICG using arrow buttons on a controller.

In a yet further additional embodiment, the user interface is configured to enable navigation within the navigation hierarchy using a joystick on a controller.

An embodiment of the method of the invention includes obtaining a navigation hierarchy for an Internet Content Guide using the common client, displaying a user interface generated by a user interface application script executing within the virtual machine using the navigation hierarchy, receiving a user selection of a piece of content identified within the Internet Content Guide via the user interface, where the Internet Content Guide includes a unique identifier associated with the content, passing the unique identifier associated with the requested content to the common client's natively implemented processes using the VM framework, obtaining media identified by the unique identifier using the common client's natively compiled processes, and decoding the obtained media using the playback device's media decoder.

DETAILED DESCRIPTION

Figure 1:
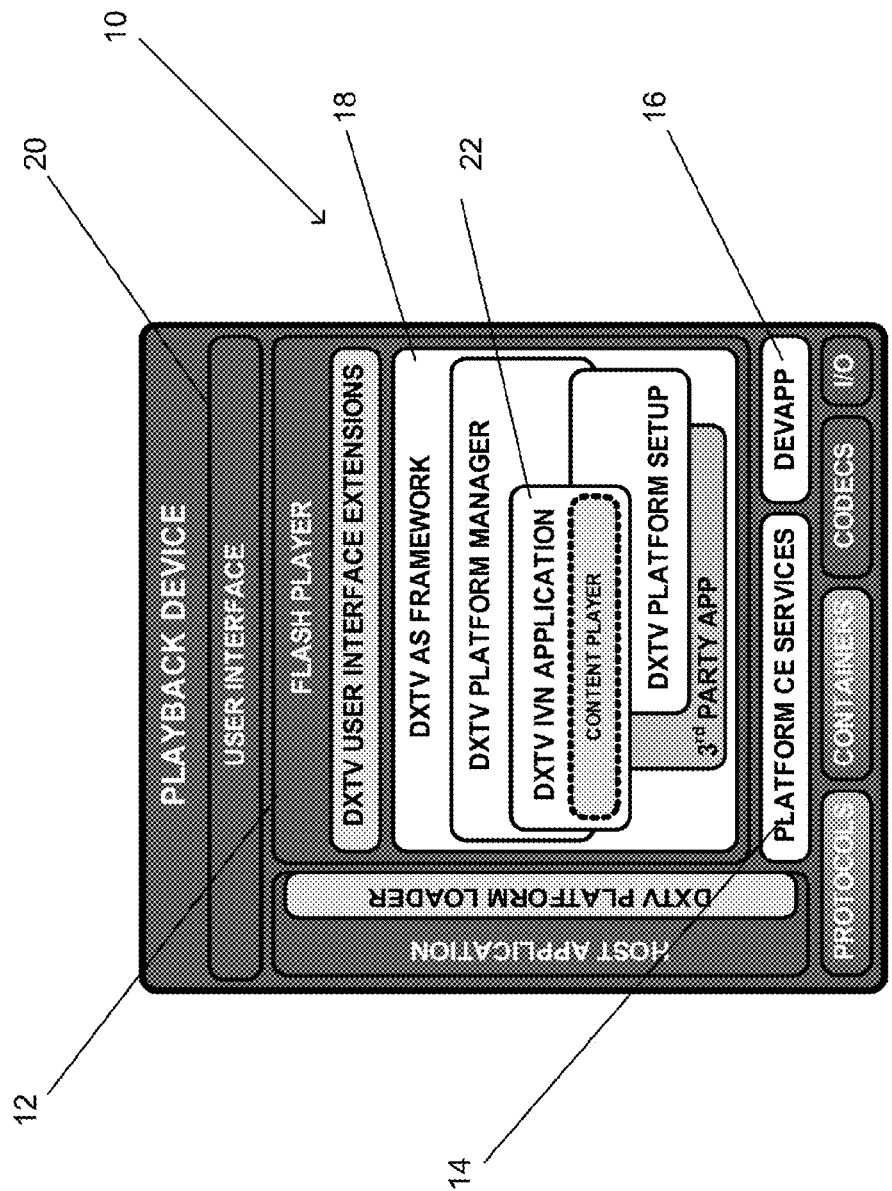
FIG. 1 illustrates a common client in accordance with an embodiment of the invention.

Turning now to the drawings, systems and methods for generating user interfaces using a natively implemented Virtual Machine (VM) and playing back content in real time on a playback device in accordance with embodiments of the invention are described. Virtual machines are software implementations of a programmable machine, where the software implementation is constrained within another processor at a higher level of symbolic abstraction. A Flash VM is capable of playing back Small Web Format (SWF) files, which is a file format specified by Adobe Systems Incorporated of San Jose, Calif. for multimedia, vector graphics, and ActionScripts, and is also capable of decoding Flash Video, which is a container file format that can be used to deliver video over the Internet. The Flash VM provides the capability of generating customized user interfaces. However, the Flash VM imposes limitations that can hinder performance in a real time environment. Specifically, the Flash VM can limit playback performance and the ability of a playback device to interact in real time with networked servers. Therefore, playback devices in accordance with embodiments of the invention include natively compiled code that implements specific functionality including but not limited to communicating with external servers and playback of content. In several embodiments, the natively compiled code implements a local resource cache to improve the speed with which Flash applications load frequently utilized resources. In a number of embodiments, applications can be installed on the playback devices that are deployed as a combination of a SWF file and an associated plug-in or dynamically loaded module of native code. In many embodiments, content player applications can be installed on the playback device to enable playback of content and advertising associated with content, and the collection of metrics.

Much of the following discussion refers to Flash players, Flash VMs and SWF files. As can readily be appreciated, any virtual machine capable of implementation on a consumer electronics device can be used in place of a Flash player/Flash VM. Therefore, the Flash player, Flash VM, SWF files, and ActionScript can be readily substituted with equivalent components associated with another virtual machine in accordance with embodiments of the invention.

Playback Devices Including Common Clients

Playback devices in accordance with embodiments of the invention typically take the form of televisions, set-top boxes, DVD/Blu-ray Disk players, mobile phone handsets or game consoles that combine Internet access capability with media playback hardware and/or software. In a number of embodiments, a common client is utilized by playback devices to generate a user interface, retrieve content for playback using the media playback hardware and/or software, and provide a runtime environment for applications. Provision of a common client reduces the amount of development effort involved in developing software for different playback devices, however, manufacturers typically desire that the user interfaces of their products have a different look and feel to the products of other manufacturers. In several embodiments, the common client includes the ability to create a customized user interface. In many embodiments, the common client includes a native implementation of a Flash VM and a user interface can be authored in Flash. The common client can also include natively compiled code that enables the client to interact in real time with networked servers and handles playback of content using the media playback capabilities of the hardware and/or software of the playback device. In a number of embodiments, the natively compiled code creates a software platform runtime on which applications can be deployed as a combination of a SWF file and an associated plug-in or dynamically loaded module of native code. In other embodiments, any of a variety of techniques can be utilized to enable the creation of customized user interfaces in accordance with embodiments of the invention.

Common Client Implementations

A playback device including a common client configured to display a custom user interface and to playback Internet content in accordance with an embodiment of the invention is illustrated in FIG. 1. The playback device 10 includes hardware and an operating system, which handle content playback and communication via the Internet. The operating system can be any operating system suitable for use on a consumer electronics device such as a Linux derivative. The playback device also includes a Flash Player 62, which provides a natively compiled Flash VM that is capable of executing SWF files and playing back Flash Movies. Examples of suitable Flash players include MachBlue from Bluestreak Technology, Inc. of Montreal, Canada and Stagecraft (Flash Lite) from Adobe Systems Incorporated of San Jose, Calif. The Flash VM can be utilized to create a user interface, including but not limited to an ICG that can be used to access Internet content, and to execute applications on the playback device. A significant aspect of the common client illustrated in FIG. 1 is that the operation of the Flash VM is enhanced by natively compiled applications/processes. In the illustrated embodiment, the operation of the Flash VM is enhanced using the natively compiled Device Application 14 and Platform Services 16, which are compiled as binaries and implement functionality that would be too slow or technology constrained if run through the Flash VM and/or implemented in ActionScript. The functionality of the Device Application and Platform Services are discussed further below as examples of the manner in which natively compiled code can be utilized to implement functionality outside of the Flash VM that can be utilized by SWF files executing within the Flash VM.

Providing Natively Implemented Functionality to Flash Applications

The natively compiled Device Application 14 efficiently implements processes for retrieving information from remote servers used in the construction of a user interface, including but not limited to obtaining a navigation hierarchy used to generate an ICG including hierarchical paths that a user can traverse to select content for playback using a unique identifier associated with the content by the ICG (such as but not limited to a URI). In many embodiments, the Device Application 14 implements functionality such as the ability to write to a file-system and to asynchronously communicate with a Flash application user interface using the Flash XMLSocket capability built into a Flash VM. The primary functions of the natively compiled Platform Services 16 is to provide support for handling media playback functionality using the media playback capabilities of the hardware and/or software of the playback device. In many embodiments, the Platform Services includes a Multimedia Framework subsystem that handles streaming, demultiplexing, decoding and playback control of content in a variety of formats including the DivX® and DivX Plus® formats specified by DivX, Inc. of San Diego, Calif. The Platform Services can also include a Local Content Caching subsystem that reduces latency in loading user interface components of the device user interface, or application user interfaces. The Local Content Caching subsystem can also be used to pre-load content and advertising to decrease playback latency. The Platform Services can handle a variety of other functions including managing applications and device security, and coordinating playback of DRM protected content.

Flash applications can execute within the Flash VM that can utilize the functionality provided by the Device Application 14, and Platform Services 16. In many instances, Flash applications including the device user interface 20 tie into the Device Application 14, and the Platform Services 16 through an ActionScript Framework, which is a set of ActionScript classes. In a number of embodiments, the ActionScript Framework is implemented as a SWF file and applications, widgets, players, and app extensions are also deployed as SWFs and are loaded into the ActionScript Framework SWF.

Figure 2:
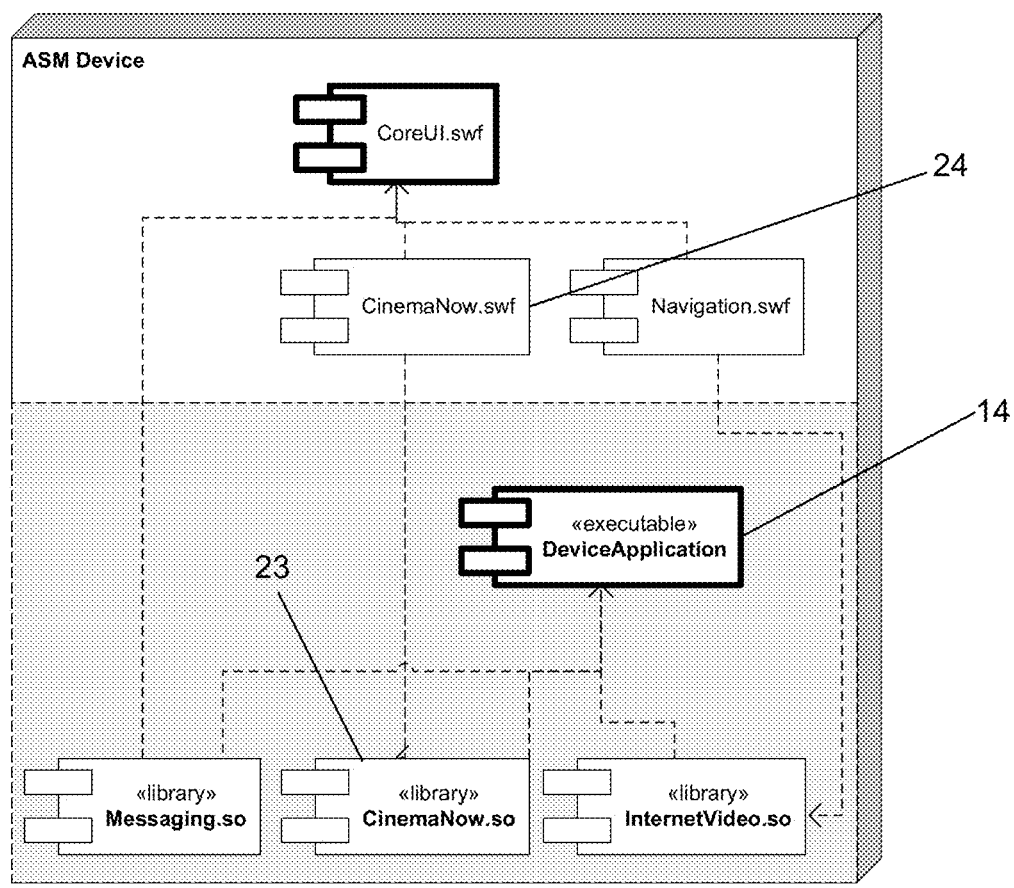
FIG. 2 illustrates deployment of an application implemented as a combination of a SWF and a natively compiled shared library to a common client in accordance with an embodiment of the invention.

As noted above, applications for playback devices in accordance with embodiments of the invention are deployed as a combination of Flash applications and Device Application plug-ins. Applications deployed as Flash applications with associated shared libraries to a common client similar to the common client described above in accordance with an embodiment of the invention are illustrated in FIG. 2. When the Device Application is a shared library, the plug-ins 23 associated with an application 24 also can be deployed as shared libraries. In which case, user interface components 24 for such applications are dependent on the Device Application-deployed plug-ins 23 for the same application, not the other way around. As is discussed further below, alternative techniques can be utilized to load native code into the common client to provide a Flash application with additional functionality beyond the capabilities of the Flash VM.

Although the common client illustrated in FIG. 1 utilizes a specific configuration involving a Flash VM, ActionScript Frameworks, Device Applications, and Platform Services to implement a User Interface and support applications, the functions performed by these components can be performed in a variety of ways. Common clients that support applications deployed as a combination of a SWF file and associated natively compiled code to perform functionality beyond the capabilities of the Flash VM can be implemented in any of a variety configurations in accordance with embodiments of the invention. A common client, where the playback device dynamically loads a natively compiled software platform to provide an application runtime environment in which similar functions to the functions performed by the Device Application and Platform Services are performed by the Software Platform Runtime and a Device Application Container, in accordance with an embodiment of the invention is discussed further below.

Dynamic Loading of a Common Client Software Platform

Figure 3:
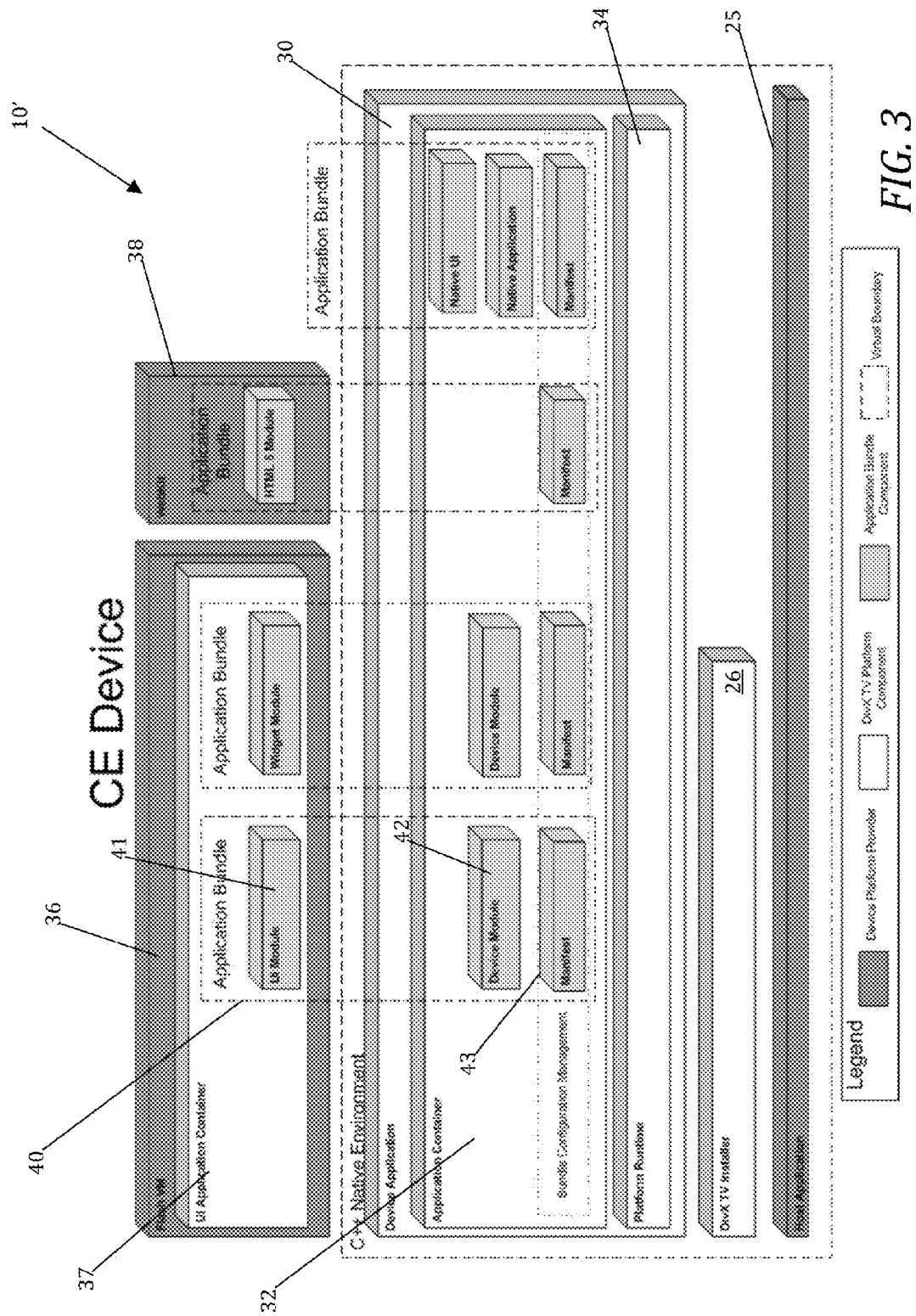
FIG. 3 illustrates a common client configured to dynamically load a software platform and application bundles in accordance with an embodiment of the invention.

A consumer electronics device on which a common client is installed that dynamically loads a software platform and applications in accordance with an embodiment of the invention is illustrated in FIG. 3. As is the case with the common client 10 shown in FIG. 1, the common client 10' includes a natively implemented Flash player and a natively compiled software platform that implements functions that would be too slow or technology constrained if run through the Flash VM and/or implemented in ActionScript. The software platform of the common client 10' shown in FIG. 3 and the applications supported by the software platform, however, can be dynamically loaded and updated. Enabling the software platform to be dynamically loaded reduces the amount of native code stored in the playback device's ROM and enables the dynamic addition of applications and user interface components when adding additional device services and features. The dynamic loading of software platforms and application is discussed in U.S. Provisional Application No. 61/430,135 the disclosure of which is incorporated by reference above.

With specific regard to FIG. 3, the common client 10' includes the installer 26 and the host application 25. The components of the dynamically loaded software platform include the components of the natively compiled device application process 30, which include a device application container 32 and a platform runtime process 34. A UI application container 37 is loaded into the Flash VM 36 of the consumer electronic device. Flash applications including the device user interface are loaded onto the playback device as application bundles 40 that can include a Flash application module 41, a natively implemented device module 42 that implements functionality complementing the Flash VM and an application manifest file 43 describing the content of the bundle and its configuration details. In the illustrated embodiment, the common client also natively implements a Webkit web browser 38 and the application bundles can include HTML 5 applications.

Figure 4:
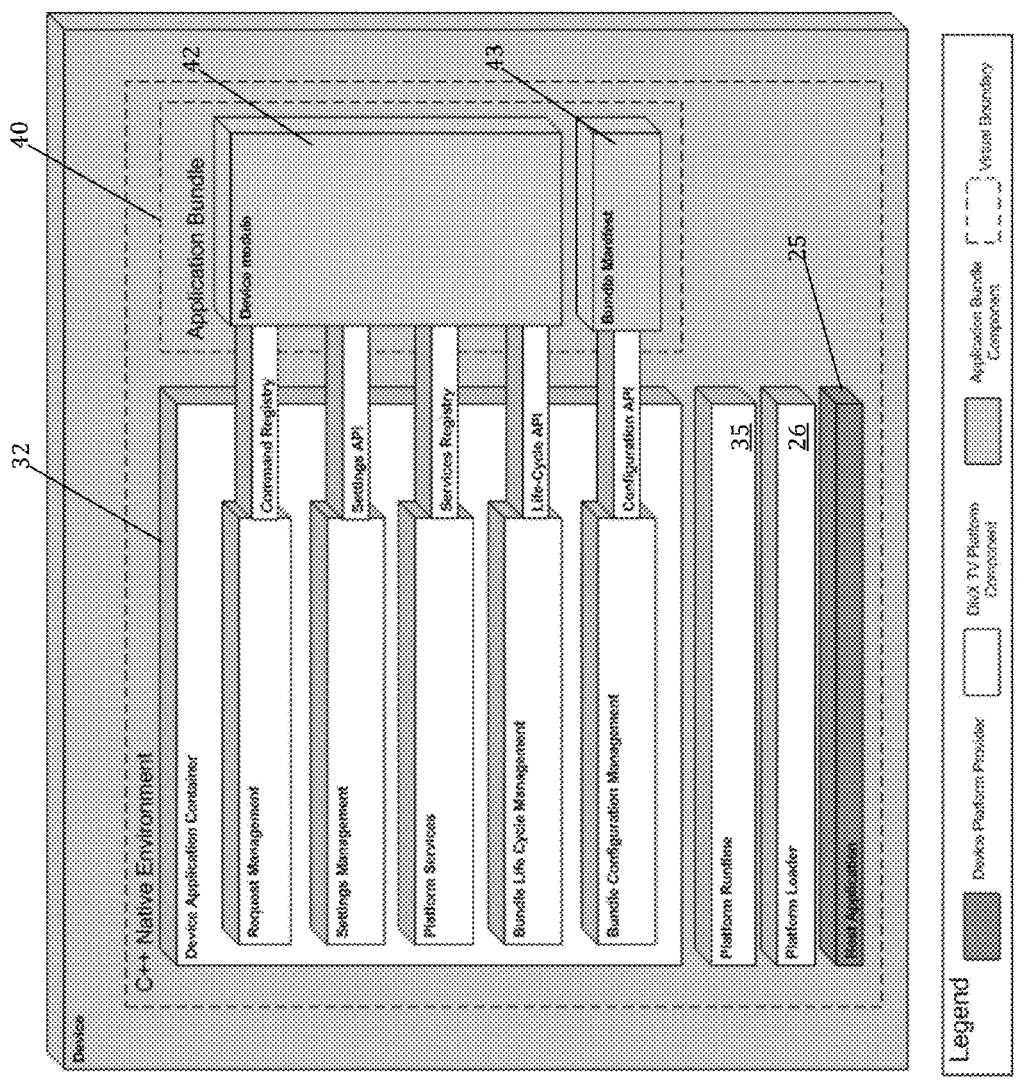
FIG. 4 conceptually illustrates a natively compiled module of an application running within a software platform runtime environment provided by a common client and utilizing services and APIs provided by a natively compiled device application bundle in accordance with an embodiment of the invention.

The device application container 32 provides a set of services and APIs that can be reused by various device user interface implementations and that allow developers to write native device modules that can be loaded and executed as part of the application bundles. The manner in which a device module 42 can utilize APIs and services in the device application 32 to perform functions outside of the Flash VM in accordance with embodiments of the invention is illustrated in FIG. 4. The UI application container 37 is configured to run inside the Flash VM to allow application bundles to run a user interface that is integrated into the main user interface loaded as part of the software platform. The UI application container can also expose a set of services and APIs that allow an application bundle to leverage the capabilities of the device application container 32. In many embodiments, the platform runtime process 26 presents an abstraction layer for specific device functionality to applications running on the software platform. The abstraction layer presented by the platform runtime process 26 and the services and APIs provided by the device application container 32 enable the natively encoded device modules utilized in each application bundle to be written using only a very small amount of native code. Therefore, the effort required to port and maintain applications can be significantly reduced. In addition, the ability to dynamically load application bundles means that the natively encoded portion of a bundle and/or the natively encoded portions of the underlying software platform can be readily updated by simply fetching the latest version of the application and/or software platform component from an update server.

As can be readily appreciated from the above discussion, common clients can be implemented in a variety of ways in which a natively implemented Flash player/Flash VM is enhanced by natively compiled applications/processes. Applications that are loaded onto a common client implemented in this manner are not limited to the functionality provided by the Flash VM and/or the functionality that can be implemented using ActionScript. Instead, applications can implement additional functionality natively and access the additional communication and media playback functionality provided natively by the common client. The implementation of various applications, including device user interfaces, and the manner in which common clients in accordance with embodiments of the invention utilize natively implemented applications/processes to handle requests by the applications to download and playback media are discussed further below.

Natively Implemented Functionality

The common clients described above include natively implemented processes that efficiently implement functionality that either cannot be performed or cannot be performed efficiently on the natively implemented Flash VM using ActionScript. Functions that are commonly performed using local processes include the playback of media and communication with remote servers. These functions are discussed below in the context of various applications including an Internet Content Guide (ICG) user interface.

Generating Custom User Interfaces Using Common Clients

Common clients in accordance with embodiments of the invention can utilize the Flash VM and natively implemented code to create customized user interfaces. In many embodiments, the playback device's Internet connection provides access to metadata, often in the form of a navigation hierarchy that can be utilized to generate an Internet Content Guide (ICG) user interface, which can be used to access content on remote sites. In several embodiments, the user interface is hierarchical and only contains listings for content capable of being played back by the playback device. Due to the hierarchical nature of the user interface, the user can navigate the ICG using arrow buttons or a joystick on a remote control or game controller. The information contained in the user interface can be utilized to retrieve content via the Internet from the appropriate content site for playback using the media playback hardware and/or software of the playback device. The generation of ICGs is described in U.S. patent application Ser. No. 12/985,222, entitled "Systems and Methods for Accessing Content Using an Internet Content Guide", filed Jan. 5, 2011, the disclosure of which is incorporated herein by reference in its entirety.

Local Caching of Content

Caching Internet content on the playback device can improve the performance of Flash applications. Therefore, many playback devices in accordance with embodiments of the invention utilize Local Content Caching. The playback device can then use the cached content to reduce access time and optimize network traffic. In a number of embodiments, local content caching is implemented using a custom URI handler within the Flash VM that intercepts and redirects URI requests to a natively implemented Cache Manager process. In several embodiments, the URI interception and redirection can be implemented using a modified HTTP client. The Cache Manager can set up access to cached data by loading cached data (if any) from persistent storage into a memory pool used to maintain a runtime cache. The Cache Manager can then handle URI request redirected from Flash applications by searching the Local Cache for the corresponding URI object. In the event that the URI object is not locally cached, the Cache Manager can initiate a HTTP request to obtain the URI object. The Cache Manager can also manage the refreshing of expired items within the cache (i.e. cached objects with timestamps that indicate they are unreliable).

Figure 5:
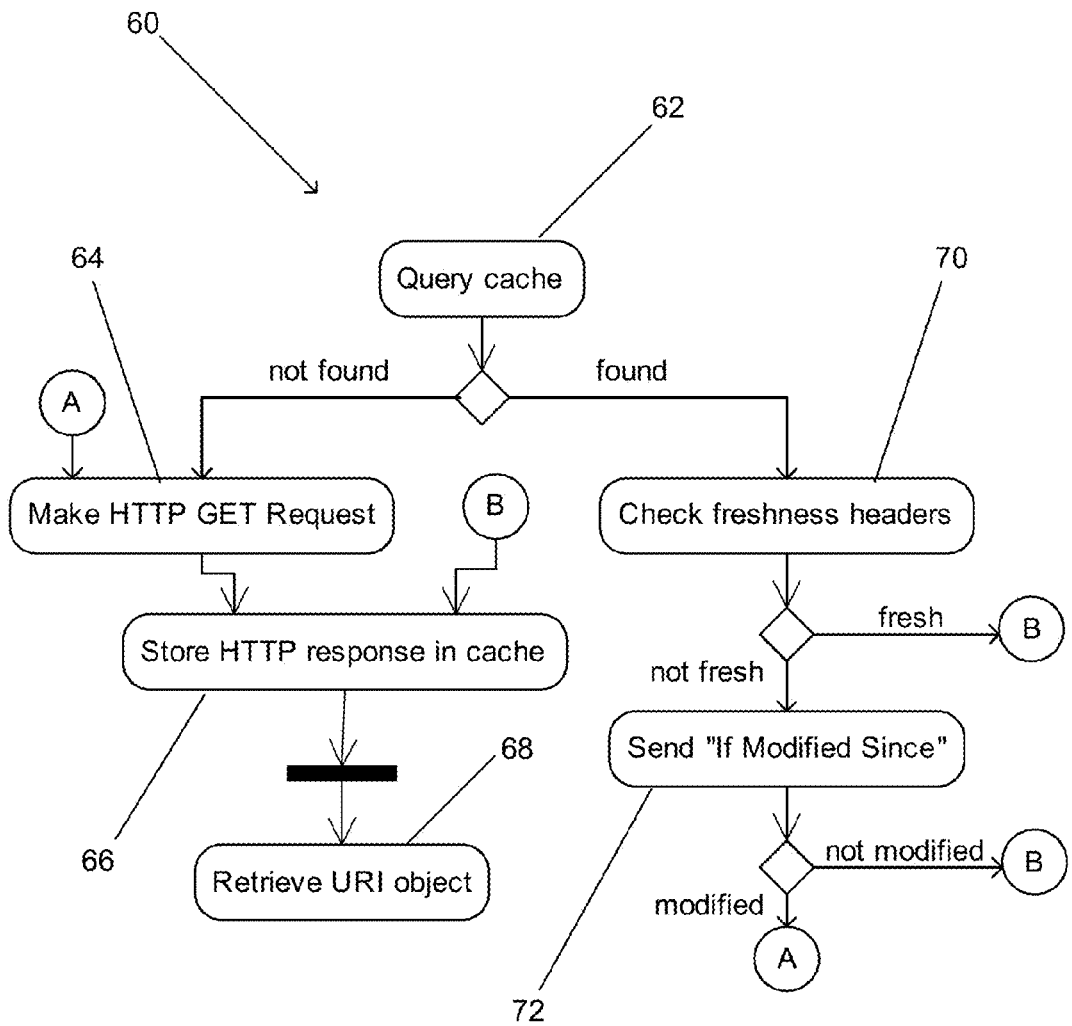
FIG. 5 illustrates a process for requesting object URIs on a common client that locally caches content in accordance with an embodiment of the invention.

A process for managing a local content cache on a playback device, which retrieves content via HTTP Get requests, in accordance with an embodiment of the invention is illustrated in FIG. 5. The process 60 commences when a URI request is received and the cache is queried (62). When the URI object is not found, a HTTP GET Request is made (64) to obtain the URI object. The HTTP response is then stored (66) in the cache and the process returns (68) the URI object for use by the Flash application that made the original URI request. When the requested URI object is found within the cache, the freshness of the URI object is checked (70) to determine whether the cached URI object is reliable. In the event that the URI object is fresh, the cached URI object is returned (68). In many embodiments, when a cached URI object that is not fresh a validation step is performed wherein the server is queried (72) via HTTP to check if the cache entry is sill valid or not. If the data has been modified since the URI object was cached, then a HTTP GET request is made (64). Otherwise, the cached URI object is returned (68). Although a specific process is illustrated in FIG. 5, other processes appropriate to the requirements of specific applications can be utilized in accordance with embodiments of the invention.

Any of a variety of techniques can be utilized to select content to store in the cache. In a number of embodiments, requested content is added to the cache. In several embodiments, the state of the user interface is used to pre-fetch content that is likely to be required based upon the navigation options presented by the user interface. In many embodiments, cached content has an associated age and/or priority that can be used in selecting content to overwrite when adding new content to the cache. In several embodiments, restrictions are placed upon the content that can be stored in the cache including but not limited to restrictions based upon the type of the content, the size of the content, and/or the age of the content.

Playback of Media

User interfaces implemented on common clients in accordance with many embodiments of the invention enable a user to select content for playback, which is typically achieved using natively implemented processes that coordinate the demuxing, decryption, decoding and rendering of multimedia content. In many instances, the natively implemented processes that handle these functions can be referred to as the common client's Multimedia Framework. In a typical scenario, the Multimedia Framework receives a URI or URL for playback from an application running within the Flash VM. The Multimedia Framework utilizes the playback device's media playback resources to achieve media playback. In many embodiments, communication between the Flash VM and the Multimedia Framework is mediated by the Platform Services, which handles communication between the Flash VM and a variety of playback device resources.

Figure 6:
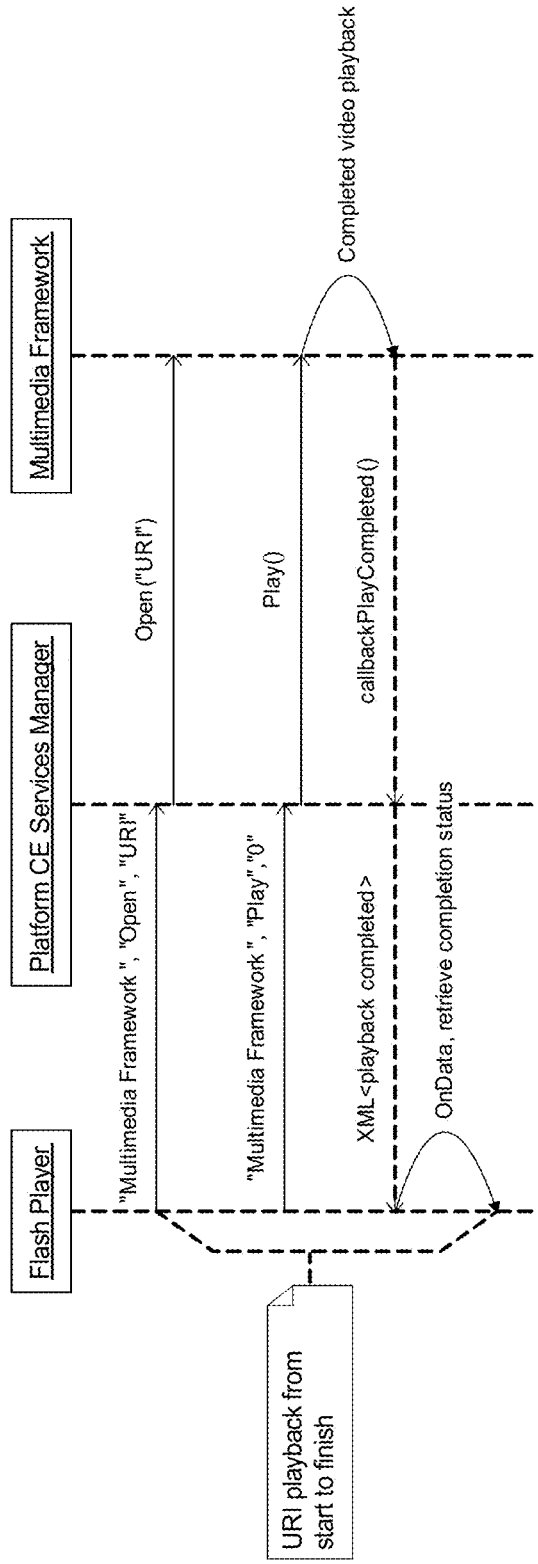
FIG. 6 illustrates communication between a Flash player, a natively implemented Platform Services process, and a Multimedia Framework in accordance with an embodiment of the invention.

A sequence diagram showing communication between a Flash VM, Platform Services, and a Multimedia Framework during playback of content in accordance with an embodiment of the invention are illustrated in FIG. 6. In the illustrated embodiment, the Flash Player provides a URI to the Platform Services process and the Platform Services module provides an instruction to the Multimedia Framework to open the URI. A similar sequence of communications instructs the Multimedia Framework to play the media identified by the URI. Upon the completion of the playback of the media indicated by the URI, the Media Framework provides notification to the Platform Services that playback is complete and the Platform Services provides an XML message to the Flash application that playback is complete. Although a specific sequence of communications and processes is illustrated in FIG. 6, other communication techniques appropriate to a specific playback device and specific natively implemented processes can also be implemented in accordance with embodiments of the invention.

Deployment of Flash Applications

Figure 7:
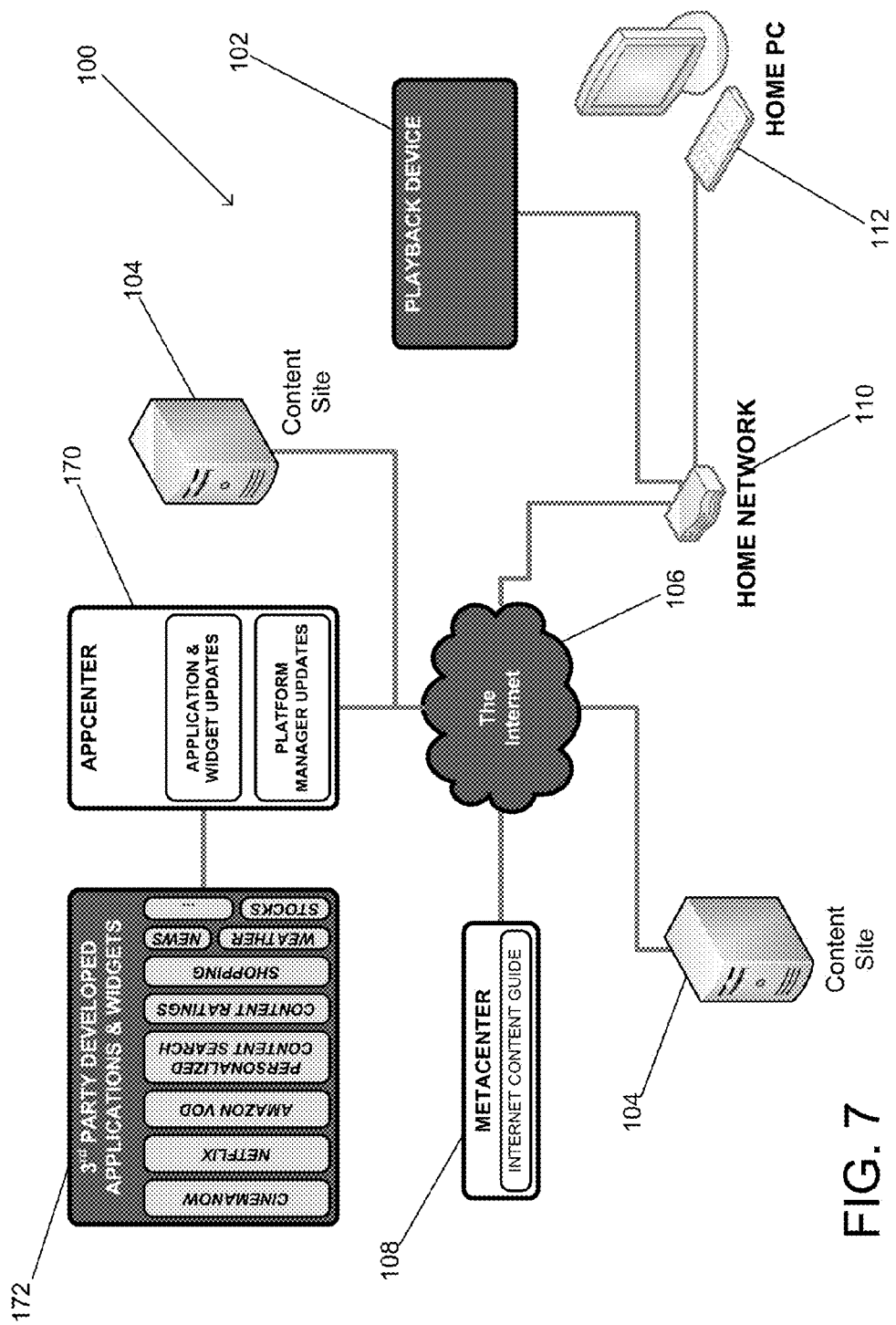
FIG. 7 illustrates a system for loading applications onto a common client that includes an Internet Content Guide user interface in accordance with an embodiment of the invention.

A playback device configured to obtain ICG metadata from a remote server, playback content from content servers, and retrieve Flash applications from remote servers in accordance with an embodiment of the invention is illustrated in FIG. 7. The system 100 includes at least one playback device 102, which includes a common client similar to the common clients described above and is configured to playback content that is accessible locally or at content sites 104 via the Internet 106. Each playback device 102 retrieves navigation hierarchy information from a content metadata database that is part of a metacenter 108 via the Internet and uses the retrieved information to generate an ICG that is navigable with the playback device's controller. The metacenter is one or more servers that are configured to manage the collection of content metadata within the content metadata database and the communication of navigation hierarchies to playback devices. The metacenter 108 constructs the content metadata database by obtaining metadata concerning content available from a number of content sites 104. The collection of metadata by metacenters is more fully described in U.S. patent Ser. No. 12/985,222, entitled "Systems and Methods for Accessing Content Using an Internet Content Guide", filed Jan. 5, 2011, the disclosure of which is incorporated by reference above. The playback device can also obtain Flash applications from the Appcenter 170, which can be provided in the cloud. In many embodiments, the applications can provide any functionality capable of execution on the playback device and may be provided by $3^{rd}$ parties (172). In other embodiments, a variety of architectures can be utilized to enable playback devices to download applications in accordance with embodiments of the invention. As discussed above, applications that require capabilities beyond those offered by the Flash VM can be deployed as a combination of a SWF and native code (including but not limited to a plug-in or a dynamically downloaded module). A variety of applications can be implemented in the manner outlined above. Of particular interest are content players and ad players, which are discussed further below.

Content Player and Ad Player

Many different Ad and Metric server solutions exist and different content providers integrate with these options as their business needs dictate. Most often, a video content provider that publishes content on the Internet along with advertising that is displayed when a web browser accesses the content. In many embodiments, playback devices include applications that enable the playback of content and associated advertising. An ICG can be built in accordance with the processes described in U.S. patent Ser. No. 12/985,222. The ICG can include information concerning content located on a content site and advertising associated with the content. The playback device can retrieve the information concerning the content and the advertising and present both the content and the advertising to the viewer. In addition to presenting advertising and collecting metrics on behalf of the operator of a content site, advertising player applications can be used to present additional advertising specific to the playback device and/or operator of the ICG. Applications can also collect metrics concerning the advertising presented on the playback device and/or other aspects of the operation of the playback device.

In a number of embodiments, the a variety of videos player applications can be loaded by a common client in accordance with embodiments of the invention including but not limited to ad players, content players, and metric players. The terms video player or video player application are generic terms describing one or more player applications of different types that are used to integrate a content provider's video content for playback on a common client in accordance with embodiments of the invention. The term can also be used to describe a set of players working together (ad, cont and/or metric players). Although the term video player is used, a video player can play any type of content. The term ad player can be used to describe a video player that interacts with an ad service on the back end to associate advertising to videos being viewed. A content player is a video player that is focused on the rendering of actual video content. A site may require a specific content player (e.g. video, music or photo), ad player, and metric player. However, a given content, ad, or metric player can be used by more than one site and there may be more than one of each type of player associated with a specific content site.

Figure 8:
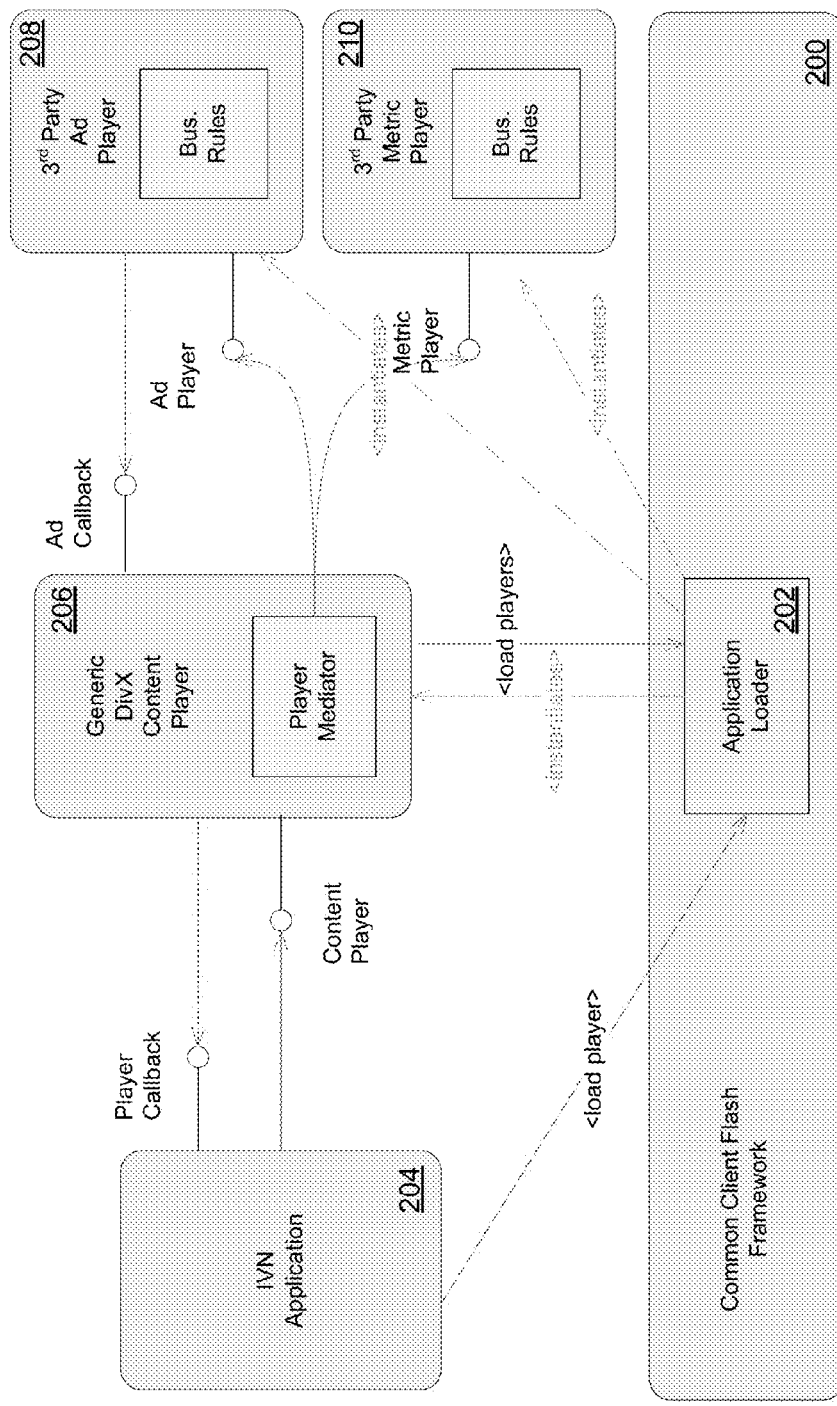
FIG. 8 conceptually illustrates the loading of a video player application to playback content selected by a user within an Internet Content Guide user interface in accordance with an embodiment of the invention.

The players are typically loaded by the portion of the common client resident within the flash VM (e.g. an ActionScript Framework or UI container). The interaction between the playback device's default content player and the additional players loaded into the Flash VM can be specified as business rules. Functional components of a video player infrastructure, where a generic content player is utilized on a playback device in accordance with an embodiment of the invention are illustrated in FIG. 8. In the illustrated embodiment, the device's ICG user interface (IVN) 204 is loaded by an application loader process 204 that forms part of the Flash framework of the common client. In response to user instructions, the ICG application can launch a generic content player application 206 and pass information to the generic content player needed to load additional content player applications (208, 210). Additional components are typically described with a unique ID, a URL to the module that contains the component, and the type of player application in the package. The ad player 208 implements an ad player interface and the metric player 210 implements a metric player interface. The content players expose an Ad Callback interface that is used by ad players to inform the content player 206 when ads of various types should be displayed. The common client's user interface can expose a player callback interface that is used by the content player application 206 to send events to the user interface application such as ad display messages (banner, pre-roll, mid-roll, and post-roll) and content status messages and metadata found inside content.

Figure 9:
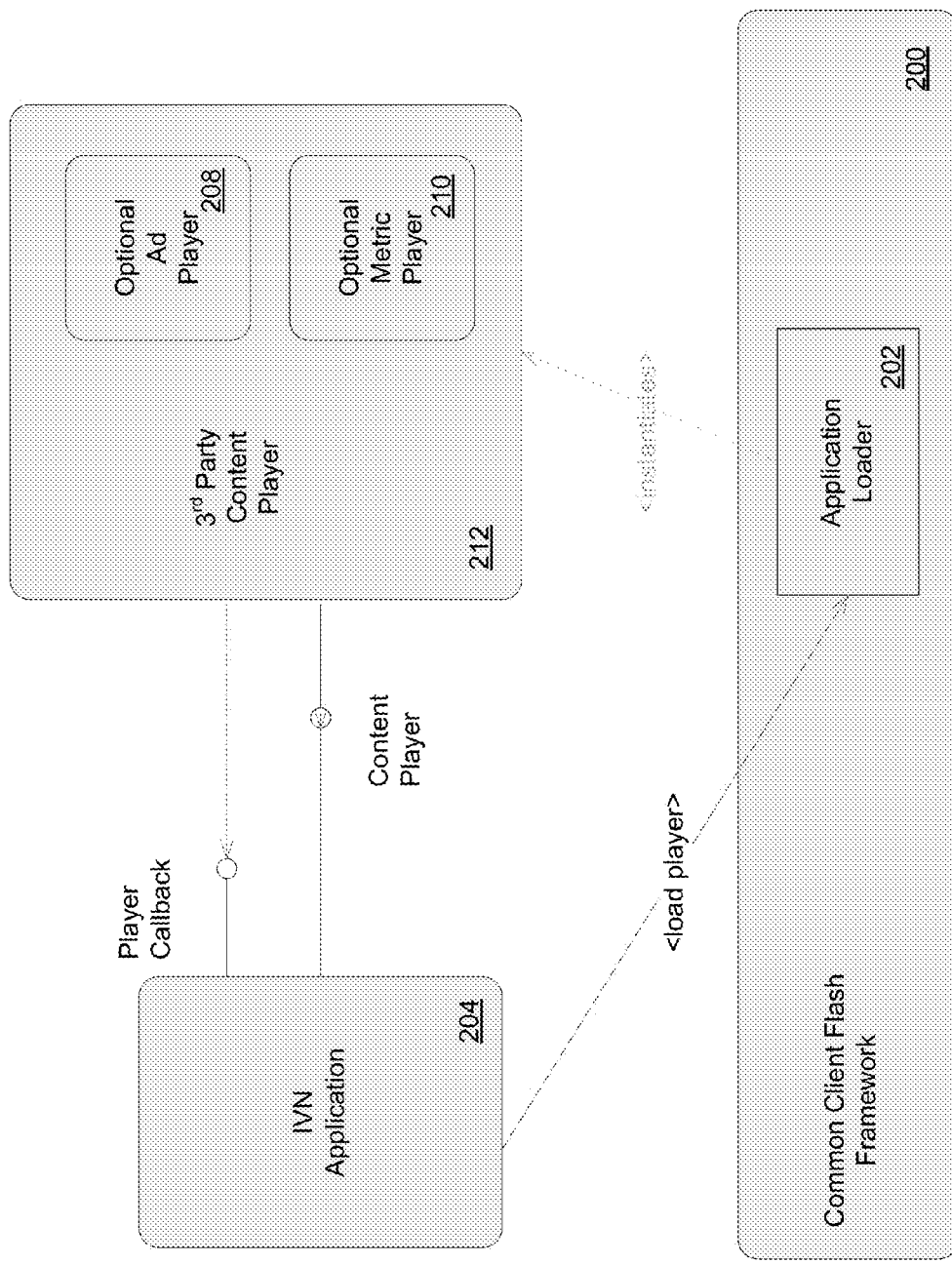
FIG. 9 conceptually illustrates the loading of a third party video player application to playback content selected by a user within an Internet Content Guide user interface in accordance with an embodiment of the invention.

The common client Flash framework also allows use of content-specific content player applications. The functional components of a the video players called when an ICG user interface receives a user instruction to playback content with which a custom content player application is associated, in accordance with an embodiment of the invention is illustrated in FIG. 9. In the illustrated embodiment, the custom content player application 212 includes an ad player 208 and a metric player 210.

Figure 10:
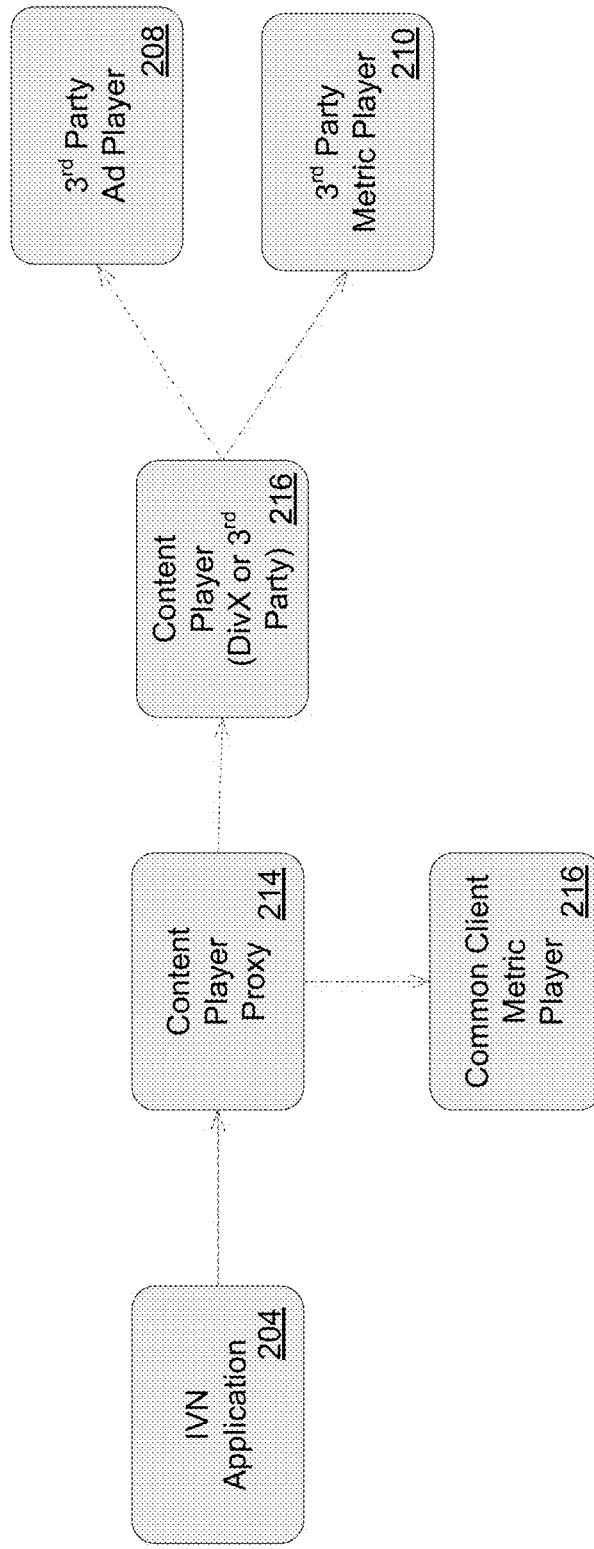
FIG. 10 conceptually illustrates the loading of content player proxy application in response to a user selecting content for playback using an Internet Content Guide user interface in accordance with an embodiment of the invention.

As indicated above, advertising that is not associated with the content can also be displayed by the playback device and metrics can be collected by the playback device. Additional advertising and metric player applications can be utilized by the playback device for this purpose and the device's user interface can make calls to the required players directly. Alternatively, as is illustrated in FIG. 10, the more elegant solution is to return a player proxy. In the illustrated embodiment, the ICG user interface 206 calls a content player proxy application 214, which calls the common client's metric player application 216, and a content player application 216. Depending on defined business rules, the proxy 214 can call either the common client's content player application or a $3^{rd}$ party content player application. Third party ad and metric player applications (208, 210) can also be called.

Figure 11:
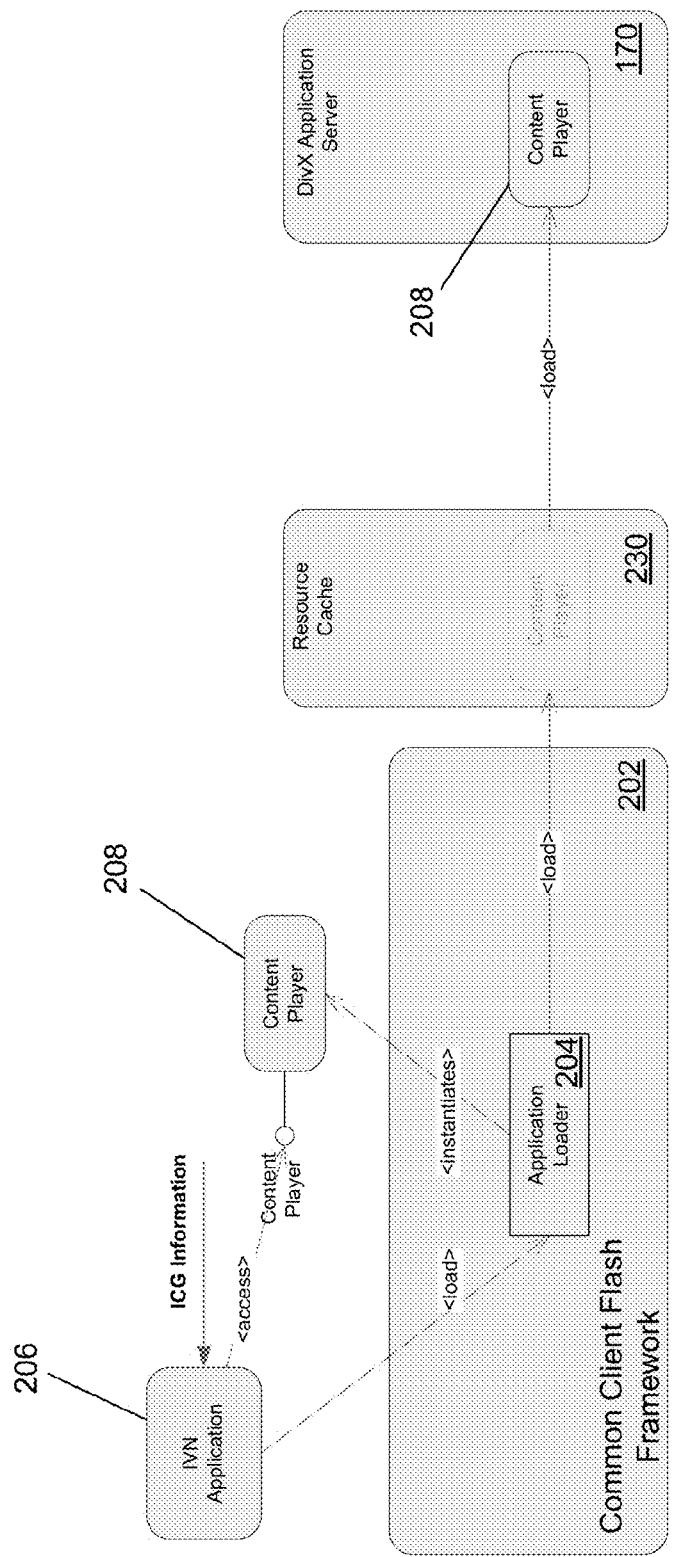
FIG. 11 conceptually illustrates a process for downloading a content player application to a common client from a remote server in accordance with an embodiment of the invention.

The players (video, ad, and metric) to be activated for particular content are determined by information associated with that content. The ICG data for particular content is obtained by the ICG user interface. Before playing content requiring a particular content player, the ICG user interface application loads the needed content player using the common client Flash framework. A process for launching players in accordance with embodiments of the invention is illustrated in FIG. 11. In the illustrated embodiment, the ICG user interface application 206 is launched and receives ICG information from a remote server, including information identifying player applications for playing back particular content. In response to a user instruction requesting playback of content with an associated content player, ad player, and/or metric player, the ICG user interface application 206 utilizes the application loader 204 within the common client Flash framework 202 to request the appropriate player application(s). In the illustrated embodiment, a content player application 208 is requested. The application loader 204 responds to the request by issuing a request to load the content player 208 using a URL received as part of the request from the ICG user interface application 206. When local caching is utilized within the common client, the local resource cache 230 is checked to determine whether the content player 208 is cached. In the event that the content player 208 is not cached, the content player is loaded from an application server 170 and cached. The application loader 204 instantiates the requested content player 208 and returns an interface to it back to the ICG user interface application 206, which can then interact with the instantiated content player.

Although specific processes for calling video player applications based upon the source of the content played back by the playback device are shown, any of a variety of process can be utilized that enable the playback of advertising and collection of metrics on behalf of sites that provide content listed within a common client's ICG in accordance with embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An Internet connected playback device, comprising:
    audio and video decoders;
    a natively implemented host process;
    a natively implemented Flash virtual machine implemented within a natively compiled Flash player; and
    a common client, comprising:
        natively implemented processes configured to coordinate playback of audio and video using the playback device's audio and video decoders;
        a device application container configured to provide a set of services and APIs;
        a platform runtime process configured to provide an abstraction layer between the playback device and the device application container;
        a VM framework configured to execute within the virtual machine and to enable scripts executing within the virtual machine to initiate playback of audio and video using the natively implemented processes; and
        a user interface implemented as an application bundle as a script in SWF configured to be executed within the virtual machine;
        wherein the functionality of the user interface that is not provided by the Flash virtual machine is provided using services and APIs provided by the device application container.

2. The Internet connected playback device of claim 1, wherein:
    the natively implemented processes are also configured to locally cache URI objects;
    the VM framework is configured to intercept URI requests made by scripts executing within the virtual machine and to provide the URI requests to the natively implemented processes; and
    the natively implemented processes are configured to verify that a requested URI object is not located within the local cache before requesting a URI object from a remote server.

3. The Internet connected playback device of claim 1, wherein:
    the common client provides a runtime environment for applications deployed as a combination of a script configured to execute within the virtual machine and natively compiled code; and
    the VM framework is configured to enable the application script to utilize the common client's natively implemented processes and the application's natively compiled code during execution of the application script within the virtual machine.

4. The Internet connected playback device of claim 3, wherein the user interface includes an Internet Content Guide identifying content on remote servers that can be played back by the playback device.

5. The Internet connected playback device of claim 4, wherein:
    the Internet Content Guide also includes information concerning video player applications associated with content identified within the Internet Content Guide;
    the VM framework is configured to request at least one video player application in response to a user selecting a piece of content within the Internet Content Guide user interface for playback, where the Internet Content Guide indicates that the at least one video player application is utilized during the playback of the selected content;
    the natively implemented processes are configured to provide requested video player applications to the VM framework;
    the VM framework is configured to instantiate video player applications provided by the natively implemented processes and provide the Internet Content Guide with interface information; and
    the Internet Content Guide user interface is configured to utilize video player interface information to coordinate content playback in conjunction with the video player application.

6. The Internet connected playback device of claim 5, wherein a content player application is requested.

7. The Internet connected playback device of claim 5, wherein an ad player application is requested.

8. The Internet connected playback device of claim 5, wherein a metric player application is requested.

9. The Internet connected playback device of claim 5, wherein the VM framework also instantiates a proxy player application.

10. The Internet connected playback device of claim 1, wherein:
    the natively implemented processes include a Device Application process configured to retrieve information from remote servers and a Platform Services process configured to handle playback of audio and video using the playback device's audio and video decoders;
    the virtual machine is a Flash virtual machine implemented within a natively implemented Flash player;
    the VM framework is an ActionScript framework comprising a set of ActionScript classes; and
    the Device Application process is configured to communicate with the ActionScript framework via the Flash player's XMLSocket capability.

11. The Internet connected playback device of claim 10, wherein applications are deployed on the common client as a SWF and a natively compiled plug-in to the Device Application process.

12. The Internet connected playback device of claim 11, wherein the Device Application process and application natively compiled plug-ins to the Device Application process are implemented as shared libraries.

13. The Internet connected playback device of claim 1, wherein:
    the common client further comprises an installer; and
    the common client is configured to provide a software platform and components of the common client can be dynamically loaded using the installer.

14. The Internet connected playback device of claim 13, wherein:
    the VM framework comprises a UI application container configured to expose a set of APIs enabling a Flash application executing within the Flash virtual machine to communicate with an associated natively implemented module;
    the user interface comprises:
        a natively compiled code module;
        the user interface SWF is configured to communicate with the natively compiled code module via the UI application container APIs.

15. The Internet connected playback device of claim 14, wherein the application bundle further comprises a manifest.

16. The Internet connected playback device of claim 14, wherein the installer is configured to dynamically load applications from a remote server, where the applications comprise:
    a SWF;
    a natively compiled code module; and
    a manifest.

17. The Internet connected playback device of claim 14, wherein the installer is implemented in playback device ROM and the installer is configured to dynamically load the software platform into device memory.

18. The Internet connected playback device of claim 1, wherein the user interface comprises an Internet Content Guide generated using a navigation hierarchy obtained by the user interface from a remote server.

19. The Internet connected playback device of claim 18, wherein the user interface is configured to enable navigation within the hierarchical ICG using arrow buttons on a controller.

20. The Internet connected playback device of claim 18, wherein the user interface is configured to enable navigation within the navigation hierarchy using a joystick on a controller.

21. A method for playing back media on a playback device, where the playback device comprises a host process, a media decoder, a natively implemented virtual machine, and a common client configured to implement a user interface using a VM framework configured to execute within the virtual machine, and to communicate with natively implemented processes configured to retrieve content from remote servers and coordinate playback of media using the media decoder, the method comprising:

- obtaining a navigation hierarchy for an Internet Content Guide using the common client;
- displaying a user interface generated by a user interface application script executing within the virtual machine using the navigation hierarchy;
- receiving a user selection of a piece of content identified within the Internet Content Guide via the user interface, where the Internet Content Guide includes a unique identifier associated with the content;
- passing the unique identifier associated with the requested content to the common client's natively implemented processes using the VM framework;
- obtaining media identified by the unique identifier using the common client's natively compiled processes; and
- decoding the obtained media using the playback device's media decoder wherein the virtual machine is a Flash virtual machine implemented within a natively compiled Flash player;

wherein the natively implemented processes comprise:

- a device application container configured to provide a set of services and APIs; and
- a platform runtime process configured to provide an abstraction layer between the playback device and the device application container;

wherein the user interface is implemented as an application bundle comprising a SWF; and wherein the natively implemented processes are configured to implement the functionality of the user interface that is not provided by the Flash virtual machine using services and APIs provided by the device application container.

* * * * *